United States Patent [19]

Iyer et al.

[11] Patent Number: 4,848,442

[45] Date of Patent: * Jul. 18, 1989

[54] RESIN BINDERS FOR FOUNDRY SAND CORES AND MOLDS

[75] Inventors: Raja Iyer, Hazelcrest; Rasik C. Shah, Des Plaines; Robert A. Laitar, Woodridge, all of Ill.

[73] Assignee: Acme Resin Corporation, Westchester, Ill.

[*] Notice: The portion of the term of this patent subsequent to Apr. 14, 2004 has been disclaimed.

[21] Appl. No.: 106,024

[22] Filed: Oct. 8, 1987

Related U.S. Application Data

[63] Continuation of Ser. No. 15,497, Feb. 6, 1987, abandoned, which is a continuation of Ser. No. 742,688, Jun. 10, 1985, abandoned, which is a continuation-in-part of Ser. No. 660,169, Oct. 12, 1984, Pat. No. 4,657,950.

[51] Int. Cl.$^4$ .................. C08K 3/22; C08L 61/14; C04B 26/12; B22C 11/22
[52] U.S. Cl. .................... 164/526; 523/145; 523/147; 524/594; 164/527
[58] Field of Search ............. 523/145, 147; 528/129, 528/112; 164/527, 526

[56] References Cited

U.S. PATENT DOCUMENTS

| 2,079,633 | 5/1937 | Rothrock | 260/4 |
|---|---|---|---|
| 2,376,213 | 5/1945 | Watson | 528/129 |
| 2,437,981 | 3/1948 | Stephan | 528/142 |
| 2,692,865 | 10/1954 | Harris | 528/129 |
| 2,962,459 | 11/1960 | Ash | 528/129 |
| 3,010,919 | 11/1961 | MacKinney | 528/129 |
| 3,039,915 | 6/1962 | Raphael | 528/129 |
| 3,053,807 | 9/1962 | Ledermar | 528/142 |
| 3,156,670 | 11/1964 | Soldatos | 528/129 |
| 3,894,981 | 7/1975 | Kruglikov et al. | 528/142 |
| 4,072,531 | 7/1978 | Funabiki et al. | 106/56 |
| 4,082,718 | 4/1978 | Ando et al. | 260/33.4 R |
| 4,140,845 | 2/1979 | Vasishth | 528/142 |
| 4,255,554 | 3/1981 | Wuskell | 528/129 |
| 4,268,648 | 5/1981 | Freitag | 528/142 |
| 4,311,619 | 1/1982 | Seeney et al. | 523/145 |
| 4,317,876 | 3/1982 | Holik | 523/143 |
| 4,317,896 | 3/1982 | Holik | 523/143 |
| 4,327,185 | 4/1982 | Bonsall | 501/89 |
| 4,371,649 | 2/1983 | Hernandez | 523/145 |
| 4,427,800 | 1/1984 | Nakamura et al. | |
| 4,448,951 | 5/1984 | Rupert | 528/129 |
| 4,473,669 | 9/1981 | Rupert | 528/129 |
| 4,495,316 | 1/1985 | Armbruster | 523/145 |
| 4,546,124 | 10/1985 | Laitar | 523/143 |
| 4,657,950 | 4/1987 | Iyer | 523/145 |
| 4,740,535 | 4/1988 | Iyer | 523/145 |

FOREIGN PATENT DOCUMENTS

| 47-41645 | 10/1972 | Japan . | |
| 197708 | 8/1977 | U.S.S.R. . | |
| 565923 | 8/1977 | U.S.S.R. | 523/145 |
| 950291 | 2/1964 | United Kingdom . | |

OTHER PUBLICATIONS

Whitehouse, et al., *Phenolic Resins;* pp. 66-69; Iliffe Books Ltd.; London 1967.

*Primary Examiner*—C. Warren Ivy
*Attorney, Agent, or Firm*—Rockey and Rifkin

[57] ABSTRACT

An alkoxy-modified phenolic resole resin providing an improved binder for foundry cores and molds. The resin has predominantly ortho-ortho benzylic ether bridges joining the phenolic nuclei in the resin and at least one alkoxymethylene group for every 20 phenolic nuclei.

12 Claims, No Drawings

RESIN BINDERS FOUNDRY SAND CORES AND MOLDS

This application is a continuation of application Ser. No. 015,497, filed Feb. 6, 1987, now abandoned, which is a continuation of application Ser. No. 742,688, filed June 10, 1985, now abandoned which is a continuation-in-part of copending application Ser. No. 660,169, filed Oct. 12, 1984, now U.S. Pat. No. 4,657,950.

FIELD OF THE INVENTION

This invention relates to modified phenolic resole resins useful as binders for making foundry sand cores and molds. The binders exhibit excellent storage properties.

BACKGROUND OF THE INVENTION

Foundry cores and molds used in making metal castings are normally prepared from a composition including sand or similar material and a curable or polymerizable binder coated on the sand particles. The purpose of this binder coating is to permit the mixture to be hardened after it is first shaped or molded into a desired form. Typically, after the aggregate material and binder have been mixed, the resulting mixture is rammed, blown or otherwise formed to the desired shape or pattern and then cured with the use of catalysts and/or heat to a solid, cured state.

When molten metal is poured into a sand mold, it solidifies taking the shape or pattern of the mold. The temperature of the molten metal is so high that the resin binder burns out of the mold. The mold then collapses leaving free-flowing sand that can be reused to make a new mold.

Different processes for forming molds and cores have been developed in the foundry industry. One process known as the "hot-box" process requires that the mixture of aggregate material and binder be cured and hardened in a holding pattern or core box while subjected to heat. Another process using a binder system which does not require heating in order to bring about curing or hardening, is known as a "no-bake" process. The present invention is directed to an improved resin for use in this "no-bake" process.

Phenol-formaldehyde resole resins have been used as binders in the "no-bake" process for making foundry cores and molds. Although these resole resins offer a favorable raw material cost when compared with other resins used in this process, they have certain limitations. Such resole resins have a limited shelf-life and must be used promptly or stored under refrigeration during warm weather. In addition, when the previously-used resole resins are mixed with sand and catalysts, the mixture has to be placed in the mold immediately or it becomes useless. Furthermore, before these resole resins can be mixed with reclaimed sand from collapsed molds, the sand must be cooled to room temperature. Otherwise, the new molds have little strength.

We have now discovered a modified resole resin which gives improved storage life without refrigeration. Its mixture with sand and catalyst can be held longer before it is put in the mold, and the resin can be used with reclaimed sand without having to cool the sand to room temperature.

SUMMARY OF THE INVENTION

In accordance with this invention, there is provided a modified phenolic resin useful as a binder for foundry cores and molds wherein said resin consists essentially of an alkoxy-modified phenolic resole resin containing at least one alkoxymethylene group for every 20 phenolic nuclei and having predominantly ortho-ortho benzylic ether bridges joining the phenolic nuclei in the resin.

Additionally, in accordance with this invention, there is provided a free-flowing granular material for the preparation of foundry cores and molds comprising an intimate mixture of sand, an acidic catalyst, and a resin binder wherein the resin binder consists essentially of an alkoxy-modified phenolic resole resin containing at least one alkoxymethylene group for every 20 phenolic nuclei and having predominantly ortho-ortho benzylic ether bridges joining the phenolic nuclei in the resin.

Finally, in accordance with this invention, there is provided a process for forming foundry cores and molds which comprises the steps of mixing sand with a resin binder and an acidic catalyst, forming the mixture of sand, catalyst, and resin binder to a desired shape, and curing the mixture, the improvement comprising using as the resin binder, an alkoxy-modified phenolic resole resin containing at least one alkoxymethylene group for every 20 phenolic nuclei and having predominantly ortho-ortho benzylic ether bridges joining the phenolic nuclei in the resin.

DETAILED DESCRIPTION OF THE INVENTION

In the practice of this invention, the alkoxy-modified phenolic resole resins can be produced by heating a mixture of an aldehyde, a phenol, and a lower aliphatic alcohol in the presence of a divalent metal ion catalyst.

Alternatively, an unmodified phenolic resole resin can be prepared by heating the aldehyde and phenol in the presence of the catalyst. This resin is then modified by heating with a lower aliphatic alcohol at a pH below 6.5 followed by dehydration to remove water produced in the reaction with the alcohol.

The preferred method for producing the alkoxy-modified phenolic resole resins of the present invention involves reacting the phenol, the aliphatic alcohol and aqueous formaldehyde at an elevated temperature in the presence of a divalent metal ion catalyst. Excess water is removed by evaporation under reduced pressure. If desired, the dehydrated product can be held at an elevated temperature under vacuum to increase the viscosity of the product. The resulting resin can be diluted with a polar solvent to obtain a product with the desired viscosity.

Phenols suitable for preparing the modified phenolic resole resins of this invention are generally any of the phenols which may be utilized in the formation of phenolic resins, and include substituted phenols, as well as unsubstituted phenol per se. The nature of the substituent can vary widely, and exemplary substituted phenols include alkyl-substituted phenols, aryl-substituted phenols, cycloalkyl-substituted phenols, alkenyl-substituted phenols, alkoxy-substituted phenols, aryloxy-substituted phenols, and halogen-substituted phenols. Specific suitable exemplary phenols include in addition to phenol per se, o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. A preferred phenolic compound is phenol itself.

The aldehyde employed in the formation of the modified phenolic resole resin employed in this invention can also vary widely. Suitable aldehydes include any of the aldehydes heretofore employed in the formation of phenolic resins, such as formaldehyde, acetaldehyde, propionaldehyde, and benzaldehyde. In general, the aldehydes employed contain from 1 to 8 caron atoms. The most preferred aldehyde is formaldehyde which may be used either as its aqueous solution or in its nonaqueous form as one of its solid polymers, such as paraformaldehyde.

Alcohols useful for preparing the alkoxy-modified phenolic resole resins of this invention are generally primary and secondary monohydric aliphatic alcohols containing from 1 to 8 carbon atoms. Examples of useful alcohols are methanol, ethanol, n-propanol, isoproponal, n-butanol, and hexanol. Methanol is a preferred alcohol.

Catalysts useful in production of the modified phenolic resole resins of the present invention include salts of the divalent ions of Mn, Zn, Cd, Mg, Co, Ni, Fe, Pb, Ca, and Ba. A preferred catalyst is zinc acetate. These catalysts give phenolic resole resins wherein the bridges joining the phenolic nuclei in the resin are predominantly ortho-ortho benzylic ether bridges of the general formula $-CH_2(OCH_2)_n-$ where n is a small positive integer.

At least 1 mole of aldehyde per mole of phenol is used to make the resole resins of this invention. It is preferable that the molar ratio of aldehyde to phenol be in the range of from about 1.2:1 to about 2.2:1.

In the preparation of the alkoxy-modified phenolic resole resins of the present invention, sufficient alcohol is used to ensure that the alkoxy-modified phenolic resole resin will have at least one alkoxymethylene group for every 20 phenolic hydroxyl groups present in the resin. The alkoxymethylene groups have the general formula $-(CH_2O)_nR$ where R is the alkyl group of the alcohol used, and n is a small positive integer. These groups are substituents at the positions ortho and para to the phenolic hydroxyl groups in the resin. When the molar ratio of alcohol to phenol in the reaction mixture is 1:1 or higher, the resulting products are satisfactory for use in the process of this invention, but the presence of larger amounts of alcohol tend to slow down the reaction between the phenol and the aldehyde and leave considerable amounts of unreacted alcohol to be evaporated at the end of the reaction.

The process of forming "no-bake" cores and molds, according to the invention, involves mixing sand or other refractory material with an acid catalyst and a modified resole resin as herein described. The resin is usually employed as a solution for ease of coating on the sand.

Polar solvents are useful for preparing solutions of the resin. Such solvents include alcohols, ketones, and esters in which the resin is soluble. Exemplary compounds are methanol, ethanol, n-propanol, isopropanol, butanol, ethylene glycol, glycerine, furfuryl alcohol, acetone, butanone, cyclohexanone, and isophorone. Alcohols, such as methanol, are the preferred solvents. The solution can contain small amounts of water, but for optimum stability of the resin, it is preferable that the water content be less than 10% by weight of this solution. The viscosity of the solution is controlled by adjusting the amount of water and solvent present. A solution having a viscosity below about 1000 centipoises (cps) at 25° C., preferably from 50 to 250 cps, is suitable for mixing with sand.

It is often the practice in the foundry art to include a variety of additives in the resins used to prepare foundry cores and molds. These additives include such materials as silanes, sources of fluoride ion, deodorizing agents and the like. When the resins are used in "no-bake" applications, it is often convenient to add urea which combines with the free formaldehyde present. Such additives may be used in the resins of the present process and do not interfere with the improved properties of these resins.

The resins of this invention are cured by means of an acidic catalyst. Any acidic catalysts ordinarily used for curing phenolic resins may be utilized. Acids that are generally useful in the "no-bake" process are strong organic acids, strong mineral acids and combinations of these. Exemplary are such acids as benzene sulfonic acid, xylene sulfonic acid, p-toluene sulfonic acid, phenol sulfonic acid, methane sulfonic acid, sulfuric acid, and mixtures thereof.

Any of the refractory material commonly used to make foundry cores and molds can be mixed with the resin compositions of this invention. These include silica sands, lake sands, bank sands, zircon sand, chromite sand, olivine sand, and the like. Also, mixtures of these may be used.

As noted above, the process for forming "no-bake" cores and molds, according to this invention, involves mixing sand or other refractory material with an acidic catalyst and a resin material as herein described. This invention involves bringing the novel resin-sand-catalyst mixture into contact with metal patterns to form cores or molds suitable for casting metal, curing the core or mold and removing it from the pattern. The temperatures and procedures involved in forming the molds and cores are those generally employed in the art.

The following examples illustrate the invention. It is to be understood that the examples are illustrative only and do not intend to limit the invention in any way. In the examples, all parts and percentages are by weight, the temperatures are degrees centigrade and the viscosity values are centipoises unless otherwise indicated.

EXAMPLE 1

A solution of 3981 g of phenol, 3603 g of a 50% formaldehyde solution, 639 g of methanol, and 311.4 g of a 25% solution of zinc acetate in water was refluxed for about 3 hours until the free formaldehyde content was between 6 and 8%. Free formaldehyde was determined by the standard hydroxylamine.hydrochloride method. Water was removed by heating under reduced pressure at 50° C. As the water was removed, the temperature slowly rose to 90° C. Then 639 g of methanol was added and the mixture was refluxed for an additional 7 hours until the free formaldehyde was less than 1.2%. The resulting resin was cooled and mixed with 200 g of methanol plus 12 g of gamma-aminopropyltriethoxy silane (available under the trade name Silane A-1100 from the Union Carbide Corp., New York, N.Y.). Viscosity of the present solution was 131 cps at 25° C. Refractive index at 25° C. was 1.5384 and the solution also contained 0.7% free formaldehyde and 6% water.

The following sand tests were performed using the resin of Example 1 and, for a comparative test, a commercial ummodified resole resin. To a K-45 KitchenAid mixer was added 2500 g of Wedron 730 washed and dried silica sand. The sand was brought to a temperature of 38° C., 10 g of a catalyst comprising an 80% solution of benzene sulfonic acid plus about 1% sulfuric acid in methanol, was added and the combination was mixed for 1 minute. Then 27.5 g of the resin was added before mixing was continued for another minute. At various times after mixing, part of the sand mixture was used to form standard American Foundry Society 1-inch dog bone tensile briquets, in a Dietert No. 696, 12-cavity tensile core box. The cores were cured at room temperature overnight. Tensile strengths of the cores were measured using a Detroit Testing Machine Company, Model CST tensile tester. Average tensile data are given in Table I. The rest of the sand was used to make a truncated pyramid core 12 inches high, 4 inches square at the base, and 2 inches square at the top, using a Dietert 623-50 core box. Sand was poured into the core box, jolted four times using a Dietert 623 core box jolter. A thermometer was inserted about 6 inches into the core. The strip time was determined as the time at which the core was cured so hard that the thermometer could no longer be pushed by hand deeper into the core. Test results are given in Table I.

TABLE I

| Mix Containing Resin of | Strip Time (min) | Tensile Strength (psi) Briquets Formed After Mix Held for | | | | |
|---|---|---|---|---|---|---|
| | | 60 sec | 210 sec | 310 sec | 450 sec | 600 sec |
| Example 1 | 32 | 481 | 324 | 217 | 145 | 108 |
| Comparative Test Resin[a] | 12 | 383 | 126 | 87 | 0 | 0 |

[a] A commercial resole resin, SUPER SET 970, of the Acme Resin Corp., Forest Park, Illinois.

The test results in Table I show that foundry sand mixes prepared using the resin of this invention have a much longer useful working life than those prepared using conventional phenolic resole resins. Furthermore, when the phenolic resole resin is stored at 31° C., it shows an exponential increase in viscosity with time and becomes so viscous that it is not suitable for use after about 2 months. In contrast, the resins of the present invention show only slight increases in viscosity and are still useful after being held for a year at these temperatures.

Superiority of the modified resole resin of the present invention over the previously-used resole resin as a binder for reclaimed sand is shown in Table II. The results given in that table were obtained using the same test conditions as those reported in Table I except that reclaimed sand was used in place of fresh sand.

TABLE II

| Mix Containing Resin of | Strip Time (min) | Tensile Strength (psi) Briquets Formed After Mix Held for | | | |
|---|---|---|---|---|---|
| | | 60 sec | 210 sec | 310 sec | 450 sec |
| Example 1 | 19 | 147 | 73 | 36 | 28 |
| Comparative Test Resin[a] | 7 | 68 | 3 | 0 | 0 |

[a] Same resin as comparative test resin of Table I.

EXAMPLE 2

The general procedure of Example 1 was followed using 1297 g of phenol, 1201 g of a 50% formaldehyde solution, 213 g of isopropanol in place of methanol, and 103.8 g of a 25% solution of zinc acetate in water. After the water had been removed by heating the mixture up to 90° C. under vacuum, an additional 213 g of isopropanol was added and the mixture was refluxed for an additional 7 hours until the free formaldehyde was less than 1.2%. The resulting resin was cooled and diluted with a mixture of 64.1 g of methanol and 4.8 g of gamma-aminopropyltriethoxy silane. The resin had a refractive index of 1.5476 and a viscosity of 980 cps at 25° C. It contained 0.65% free formaldehyde and 5.5% water. The results of tests using this as a resin binder for sand are given in Table III.

EXAMPLE 3

The general procedure of Example 1 was followed using 1297 g of phenol, 1201 g of a 50% aqueous formaldehyde solution, 213 g of ethanol in place of the methanol, and 103.8 g of a 25% solution of zinc acetate in water. After the water had been removed by heating the mixture to 90° C. under vacuum, an additional 213 g of ethanol was added. The mixture was refluxed for an additional 7 hours until the free formaldehyde was less than 1.2%. The resulting resin was cooled and mixed with 65 g of methanol and 4.8 g of Silane A-1100. The viscosity of the solution was 380 cps at 25° C., the refractive index at this temperature was 1.5463, and it contained 0.8% free formaldehyde and 6.7% water. This resin was also mixed with sand and catalyst and the resulting mix was used to perform the tests as described in Example 1. The results of the tests are given in Table III which contains the results of tests on the resin of Example 1 for comparison purposes.

TABLE III

| Mix Containing Resin of | Strip Time (min) | Tensile Strength (psi) Briquets Formed After Mix Held for | | | | |
|---|---|---|---|---|---|---|
| | | 60 sec | 210 sec | 310 sec | 450 sec | 600 sec |
| Example 1 (Methoxy Derivative) | 24 | 513 | 349 | 150 | 150 | 79 |
| Example 2 (Isopropoxy Derivative) | 13 | 379 | 198 | 53 | 29 | 0 |
| Example 3 (Ethoxy Derivative) | 15 | 465 | 304 | 151 | 61 | 17 |

The results in Table III show that the ethoxy- and isopropoxy-modified resole resins, as well as the methoxy derivative, are useful resins for preparing foundry sand mixes with an extended working life.

EXAMPLE 4

A methoxy-terminated resin was made as in Example 1 except that the dehydration step was continued until the water content of the resin was only 0.8%. The resin had a viscosity of 548 cps at 25° C. and a refractive index of 1.5480. a blend of this resin and the resin of Example 1 was made to give a resin containing 3.2% water and with a viscosity of 262 cps. Two other similar resins were obtained having water contents of 5.6 and 9.7% with viscosities of 142 and 109 cps, respectively. All four resins were used to prepare sand, catalyst, and resin mixes in the proportions described under Example 1, and the mixes were tested under the conditions given in that example except that the tensiles were determined after the briquets had been held for 5 hours rather than overnight. For comparison purposes, sand tests were also run using a commerical resole resin known to contain about 12% moisture and having a viscosity of 79 cps at 25° C. Results of the tests are given in Table IV. It was noted that the resin solution containing 9.7% moisture was somewhat hazy, indicating that these resins would probably separate from solution if the water content was greater than 10%.

TABLE IV

| Mix Using Methoxy Resin with | Strip Time (min) | Tensile strength (psi) Briquets Formed After Mix Held for | | | |
|---|---|---|---|---|---|
| | | 60 sec | 210 sec | 310 sec | 450 sec |
| 0.8% H$_2$O | 14 | 100 | 35 | 10 | 0 |
| 3.2% H$_2$O | 17 | 173 | 125 | 88 | 0 |
| 5.6% H$_2$O | 30 | 228 | 155 | 138 | 53 |
| 9.7% H$_2$O | 33 | 200 | 199 | 165 | 100 |
| Comparative Resin[a] | 16 | 195 | 128 | 32 | 0 |

[a]Comparative resin of Table I.

EXAMPLE 5

To 480 g of the resin solution of Example 1 was added 120 g of furfuryl alcohol. The viscosity of the resulting solution was 60 cps at 25° C. Its refractive index at 25° C. was 1.5323 and the solution contained 0.6% free formaldehyde and 4.5% water. Then the resin solution was mixed with sand and catalyst, and the mixture was used immediately in the sand tests of Example 1. Results of these tests are given in Table V. Similar sand tests were performed using a resin solution which had been held at 31° C. for 1 week. The resin solution showed essentially no viscosity change during this week of incubation.

TABLE V

| Mix Containing Resin of | Strip Time (min) | Tensile Strength (psi) After Briquets Held for | | |
|---|---|---|---|---|
| | | 2 hrs | 4 hrs | 24 hrs |
| Example 5 | 33 | 242 | 262 | 207 |
| Example 5 after holding 1 week at 31° C. | 45 | 250 | 292 | 293 |

Thus, it is apparent that there has been provided in accordance with the invention, a resin useful as a binder for foundry cores and molds that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. A granular material useful for the preparation of foundry cores and molds comprising an intimate mixture of sand, an acidic catalyst, and about 1% based on the weight of the sand of a preformed resin binder wherein the resin binder is one produced in the presence of a divalent metal ion catalyst and consists essentially of an alkoxy-modified phenolic resole resin containing at least one alkoxymethylene group for every 20 phenolic nuclei and having predominantly ortho-ortho benzylic ether bridges joining the phenolic nuclei in the resin.

2. The granular material of claim 1 wherein the alkoxy-modified phenolic resole resin is a methoxy-modified phenolic resole resin.

3. The granular material of claim 2 wherein the phenolic resole resin is prepared from phenol and formaldehyde.

4. The granular material of claim 1 wherein the alkoxy-modified phenolic resole resin is an ethoxy-modified phenolic resole resin.

5. The granular material of claim 1 wherein the alkoxy-modified phenolic resole resin is an isopropoxy-modified phenolic resole resin.

6. The granular material of claim 1 wherein the acidic catalyst is a sulfonic acid catalyst.

7. In a process for forming foundry cores and molds comprising the steps of mixing sand with about 1% based on the weight of the sand of a preformed resin binder and an acidic catalyst, forming the mixture of sand, catalyst, and resin binder to a desired shape, and curing the mixture, the improvement comprising using as the resin binder, an alkoxy-modified phenolic resole resin produced in the presence of a divalent metal ion catalyst, said resin containing at least one alkoxymethylene group for every 20 phenolic nuclei and having predominantly ortho-ortho benzylic ether bridges joining the phenolic nuclei in the resin.

8. The process of claim 7 wherein the alkoxy-modified phenolic resole resin is a methoxy-modified phenolic resole resin.

9. The process of claim 8 wherein the phenolic resole resin is prepared from phenol and formaldehyde.

10. The process of claim 7 wherein the alkoxy-modified phenolic resole resin is an ethoxy-modified phenolic resole resin.

11. The process of claim 7 wherein the alkoxy-modified phenolic resole resin is an isopropoxy-modified phenolic resole resin.

12. The process of claim 7 wherein the acidic catalyst is a sulfonic acid catalyst.

* * * * *